(12) United States Patent (10) Patent No.: US 7,792,069 B2
Karabinis (45) Date of Patent: Sep. 7, 2010

(54) SYSTEMS AND METHODS FOR TERRESTRIAL REUSE OF CELLULAR SATELLITE FREQUENCY SPECTRUM USING DIFFERENT CHANNEL SEPARATION TECHNOLOGIES IN FORWARD AND REVERSE LINKS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 654 days.

(21) Appl. No.: 11/762,323

(22) Filed: Jun. 13, 2007

(65) Prior Publication Data

US 2007/0232298 A1 Oct. 4, 2007

Related U.S. Application Data

(63) Continuation-in-part of application No. 11/021,077, filed on Dec. 23, 2004, now Pat. No. 7,664,460, which is a continuation-in-part of application No. 10/730,660, filed on Dec. 8, 2003, now Pat. No. 7,593,724, which is a continuation-in-part of application No. 10/074,097, filed on Feb. 12, 2002, now Pat. No. 6,684,057.

(60) Provisional application No. 60/322,240, filed on Sep. 14, 2001.

(51) Int. Cl.
 *H04B 7/185* (2006.01)
(52) U.S. Cl. ..................................... 370/316; 455/427
(58) Field of Classification Search ................ 455/12.1, 455/13.2, 13.3, 454, 427; 370/316
See application file for complete search history.

(56) References Cited

U.S. PATENT DOCUMENTS

| 4,697,188 | A | 9/1987 | Lin |
| 4,901,307 | A | 2/1990 | Gilhousen et al. |
| 5,073,900 | A | 12/1991 | Mallinckrodt |
| 5,303,286 | A | 4/1994 | Wiedeman |
| 5,339,330 | A | 8/1994 | Mallinckrodt |
| 5,394,561 | A | 2/1995 | Freeburg |

(Continued)

FOREIGN PATENT DOCUMENTS

EP 0 506 255 A2 9/1992

(Continued)

OTHER PUBLICATIONS

Communication pursuant to Article 94(3) EPC, EP Application No. 02 761 235.7, Oct. 19, 2009.

(Continued)

*Primary Examiner*—Sam Bhattacharya
(74) *Attorney, Agent, or Firm*—Myers Bigel Sibley & Sajovec, P.A.

(57) ABSTRACT

A wireless communications system includes a terrestrial network that is configured to receive wireless communications from radiotelephones over satellite band frequencies that are divided into channels that are separated by one of frequency or code (e.g., OFDMA or CDMA). The terrestrial network is also configured to transmit wireless communications to radiotelephones over satellite band frequencies that are divided into channels that are separated by a different one of frequency or code (e.g., CDM or OFDM). Related devices and methods are also disclosed.

57 Claims, 11 Drawing Sheets

U.S. PATENT DOCUMENTS

| | | |
|---|---|---|
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,734,678 A | 3/1998 | Paneth et al. |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,951,709 A | 9/1999 | Tanaka |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,064,645 A | 5/2000 | Develet, Jr. et al. |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,111,503 A | 8/2000 | Javitt et al. |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,411,609 B1 | 6/2002 | Emmons, Jr. et al. |
| 6,418,147 B1 | 7/2002 | Wiedeman |
| 6,449,461 B1 | 9/2002 | Otten |
| 6,463,279 B1 | 10/2002 | Sherman et al. |
| 6,522,865 B1 | 2/2003 | Otten |
| 6,570,858 B1 | 5/2003 | Emmons, Jr. et al. |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,142,580 B1 | 11/2006 | Balachandran et al. |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 2001/0030956 A1 | 10/2001 | Chillariga et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260948 A1 | 11/2005 | Regulinski et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |

| | | | |
|---|---|---|---|
| 2006/0189274 A1 | 8/2006 | Karabinis | |
| 2006/0189275 A1 | 8/2006 | Karabinis | |
| 2006/0189309 A1 | 8/2006 | Good et al. | |
| 2006/0194576 A1 | 8/2006 | Karabinis et al. | |
| 2006/0205346 A1 | 9/2006 | Evans et al. | |
| 2006/0205347 A1 | 9/2006 | Karabinis | |
| 2006/0205367 A1 | 9/2006 | Karabinis | |
| 2006/0211371 A1 | 9/2006 | Karabinis et al. | |
| 2006/0211419 A1 | 9/2006 | Karabinis | |
| 2006/0211452 A1 | 9/2006 | Karabinis | |
| 2006/0217070 A1 | 9/2006 | Karabinis | |
| 2006/0232465 A1 | 10/2006 | Levin et al. | |
| 2006/0233147 A1 | 10/2006 | Karabinis | |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0292990 A1 | 12/2006 | Karabinis et al. | |
| 2007/0010246 A1 | 1/2007 | Churan | |
| 2007/0015460 A1 | 1/2007 | Karabinis et al. | |
| 2007/0021059 A1 | 1/2007 | Karabinis et al. | |
| 2007/0021060 A1 | 1/2007 | Karabinis et al. | |
| 2007/0026867 A1 | 2/2007 | Karabinis | |
| 2007/0037514 A1 | 2/2007 | Karabinis | |
| 2007/0072545 A1 | 3/2007 | Karabinis et al. | |
| 2007/0087690 A1 | 4/2007 | Karabinis | |
| 2007/0099562 A1 | 5/2007 | Karabinis et al. | |
| 2009/0186622 A1* | 7/2009 | Karabinis | 455/446 |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 699 A2 | 3/1997 |
| EP | 0 762 699 A3 | 3/1997 |
| EP | 0 797 319 A2 | 9/1997 |
| EP | 0 831 599 A2 | 3/1998 |
| EP | 0 831 599 A3 | 3/1998 |
| EP | 0 977 375 A2 | 2/2000 |
| EP | 1 052 790 A1 | 11/2000 |
| EP | 1 059 826 A1 | 12/2000 |
| EP | 1 193 989 A1 | 4/2002 |
| MX | PA 04002458 A | 4/2005 |
| WO | WO 99/10994 A1 | 3/1999 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

Global.com, "Globalstar Demonstrates World's First Prototype of Terrestrial System to Supplemental Phones," http://www.globalcomsatphone.com/globalcom/globalstar_terrestrial_system.html, Jul. 18, 2002, 2 pages.

International Preliminary Examination Report, PCT/US02/24783, Apr. 30, 2003.

International Search, PCT/US02/24783, Dec. 10, 2002.

Notification of Transmittal of the International Search Report and the Written Opinion of the International Searching Authority, PCT/US2005/044336, Apr. 24, 2006.

Communication with Supplementary European Search Report, EP 02761235.7, Sep. 3, 2008.

* cited by examiner

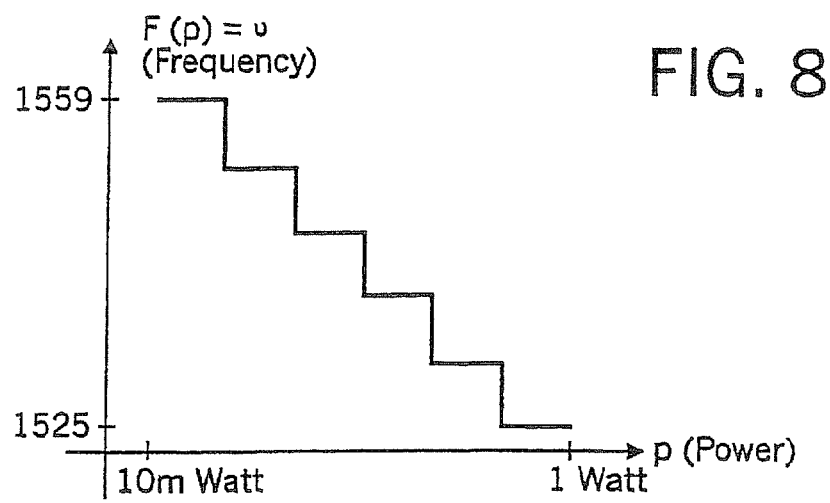
FIG. 8
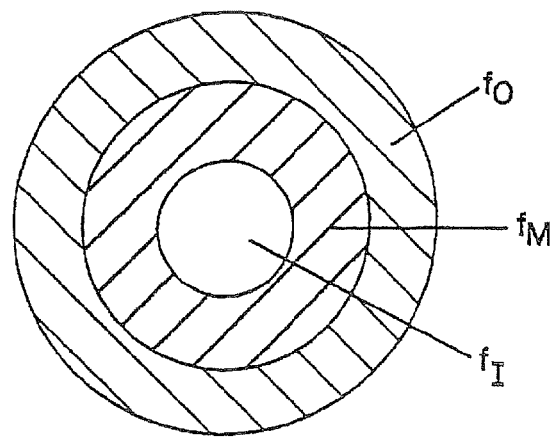
FIG. 9
FIG. 10
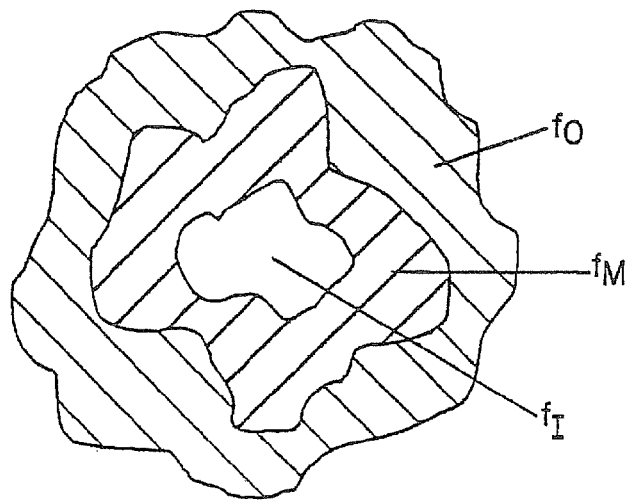

SYSTEMS AND METHODS FOR TERRESTRIAL REUSE OF CELLULAR SATELLITE FREQUENCY SPECTRUM USING DIFFERENT CHANNEL SEPARATION TECHNOLOGIES IN FORWARD AND REVERSE LINKS

CROSS-REFERENCE TO RELATED APPLICATIONS

This application is a Continuation-in-Part (CIP) of application Ser. No. 11/021,077, filed Dec. 23, 2004, now U.S. Pat. No. 7,664,460 entitled Systems and Methods for Terrestrial Reuse of Cellular Satellite Frequency Spectrum in a Time-Division Duplex and/or Frequency-Division Duplex Mode, which itself is a CIP of application Ser. No. 10/730,660, filed Dec. 8, 2003, now U.S. Pat. No. 7,593,724 entitled Systems and Methods for Terrestrial Reuse of Cellular Satellite Frequency Spectrum in a Time-Division Duplex Mode, which itself is a CIP of application Ser. No. 10/074,097, filed Feb. 12, 2002, entitled Systems and Methods for Terrestrial Reuse of Cellular Satellite Frequency Spectrum, now U.S. Pat. No. 6,684,057, which itself claims the benefit of provisional Application No. 60/322,240, filed Sep. 14, 2001, entitled Systems and Methods for Terrestrial Re-Use of Mobile Satellite Spectrum, all of which are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

Terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention provide wireless communications systems that include a space-based component and an ancillary terrestrial component. The space-based component is configured to receive wireless communications from radiotelephones in a satellite footprint over at least one satellite band frequency and to transmit wireless communications to radiotelephones in the satellite footprint over at least one satellite band frequency. The ancillary terrestrial component is configured to receive wireless communications from radiotelephones in the satellite footprint over a plurality of satellite band frequencies that are divided into channels that are separated by one of frequency or code, and to transmit wireless communications to radiotelephones in the satellite footprint over a plurality of satellite band frequencies that are divided into channels that are separated by a different one of frequency or code. Thus, different channel separation technologies are used in the forward and reverse links of the ancillary terrestrial component.

In some embodiments, the ancillary terrestrial component is configured to receive wireless communications from radiotelephones in the satellite footprint over a plurality of satellite band frequencies that are divided into channels that are separated by code and to transmit wireless communications to radiotelephones in the satellite footprint over a plurality of satellite band frequencies that are divided into channels that are separated by frequency. In other embodiments, the ancillary terrestrial component is configured to receive wireless communications from radiotelephones in the satellite footprint over a plurality of satellite band frequencies that are divided into channels that are separated by frequency and to transmit wireless communications to radiotelephones in the satellite footprint over a plurality of satellite band frequencies that are divided into channels that are separated by code. In some embodiments, the channels may be separated by code using Code Division Multiple Access (CDMA) and the channels may be separated by frequency using Orthogonal Frequency Division Multiplexing (OFDM). In other embodiments, the channels may be separated by frequency using a Global System for Mobile communications (GSM) standard.

In other embodiments, the ancillary terrestrial component may be further configured to receive wireless communications from radiotelephones in the satellite footprint over a plurality of satellite band frequencies and to transmit wireless communications to radiotelephones in the satellite footprint over a plurality of satellite band frequencies using Frequency Division Duplex (FDD) and/or Time Division Duplex (TDD) mode(s).

In still other embodiments, in the FDD mode, the communications between the ancillary terrestrial component and the radiotelephones may be based on a reverse frequency mode relative to the space-based component. Thus, for example, a given satellite band frequency is used by the space-based component to receive wireless communications from radiotelephones in the satellite footprint, and by the ancillary terrestrial component to transmit wireless communications to radiotelephones in the satellite footprint, in some embodiments. In other embodiments, a given satellite band frequency is used by the space-based component to transmit wireless communications to radiotelephones in the satellite footprint and by the ancillary terrestrial component to receive wireless communications from radiotelephones in the satellite footprint.

In still other embodiments, the space-based component also may use different channel separation technologies in its forward and reverse links. For example, in some embodiments, the space-based component may also be configured to receive wireless communications from wireless telephones in the satellite footprint over a plurality of satellite band frequencies that are divided into channels that are separated by one of frequency or code, and to transmit wireless communications to radiotelephones in the satellite footprint over a plurality of satellite band frequencies that are divided into channels that are separated by a different one of frequency or code. For example, the space-based component may be configured to receive wireless communications from radiotelephones in the satellite footprint using CDMA and to, transmit wireless communications to radiotelephones in the satellite footprint using OFDM.

Wireless communications systems according to other embodiments of the present invention include a terrestrial network that is configured to receive wireless communications from radiotelephones over a plurality of satellite band frequencies that are divided into channels that are separated by one of frequency or code and to transmit wireless communications to radio terminals over a plurality of satellite band frequencies that are divided into channels that are separated by a different one of frequency or code. In some embodiments, the ancillary terrestrial component is configured to receive wireless communications from radiotelephones over a plurality of satellite band frequencies that are divided into channels that are separated by code and to transmit wireless communications to radiotelephones over a plurality of satellite band frequencies that are divided into channels that are separated by frequency. In other embodiments, the ancillary terrestrial component is configured to receive wireless communications from radiotelephones over a plurality of satellite band frequencies that are divided into channels that are separated by frequency and to transmit wireless communications to radiotelephones over a plurality of satellite band frequencies that are divided into channels that are separated by code. In yet other embodiments, the ancillary terrestrial component is configured to receive wireless communications from radioterminals using CDMA and to transmit wireless communications to radioterminals using OFDM and/or GSM. As was the case in the above-described embodiments, FDD and/or TDD modes also may be used.

Still other embodiments of the present invention provide radiotelephones that comprise a transceiver system that is configured to transmit wireless communications over a plurality of satellite band frequencies that are divided into channels that are separated by one of frequency or code and to receive wireless communications over a plurality of satellite band frequencies that are divided into channels that are separated by a different one of frequency or code. In some embodiments, the transceiver system is configured to transmit wireless communications using CDMA and to receive wireless communications using OFDM and/or GSM. FDD and/or TDD modes also may be provided. The transceiver system may also be configured to transmit wireless communications over satellite band frequencies that are divided into channels that are separated by one of frequency or code and to receive wireless communications over satellite band frequencies that are divided into channels that are separated by a same one of frequency or code.

In further embodiments, a space-based component (comprising one or more satellites), a terrestrial network (that may be an ancillary terrestrial network) and/or one or more radiotelephones (or radioterminals) may be configured to receive wireless communications over a plurality of frequencies (that may, in some embodiments be, at least partially, satellite band frequencies) that are divided into channels that are separated by a first combination of frequency, code, time phase and/or polarization and to transmit wireless communications over a plurality of frequencies (that may, in some embodiments be, at least partially, satellite band frequencies) that are divided into channels that are separated by a second combination of frequency, code, time, phase and/or polarization; wherein the first combination differs from the second combination. For example, in some embodiments, the first combination of frequency, code, time, phase and/or polarization may comprise channels separated by frequency and/or phase and the second combination of frequency, code, time, phase and/or polarization may comprise channels separated by code and/or polarization. Many other first and second combinations are possible as will be recognized by those skilled in the art.

It will be understood by those having skill in the art that embodiments of the invention have been described herein primarily with respect to wireless communications systems and components thereof. However, other embodiments provide analogous methods of operating a wireless communications system that may be performed by a space-based component, an ancillary terrestrial component and/or a radiotelephone. Accordingly, cellular satellite frequency spectrum and/or any other spectrum may be used to provide wireless communications using different channel separation technologies in forward and reverse links.

BRIEF DESCRIPTION OF THE DRAWINGS

FIG. 5 illustrates time-division duplex frame structures according to embodiments of the present invention.

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
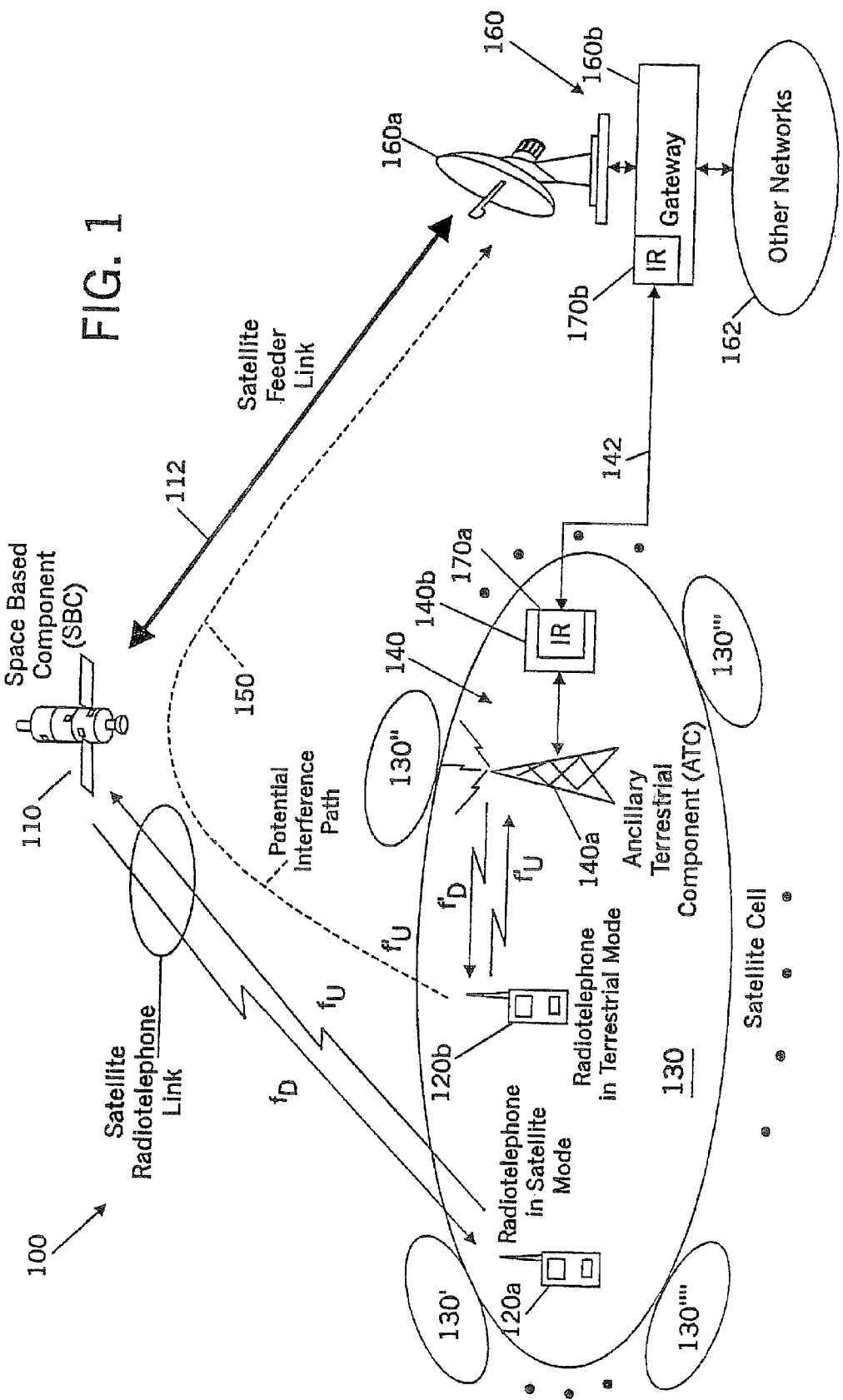
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130-130'''' over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U=f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f'_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
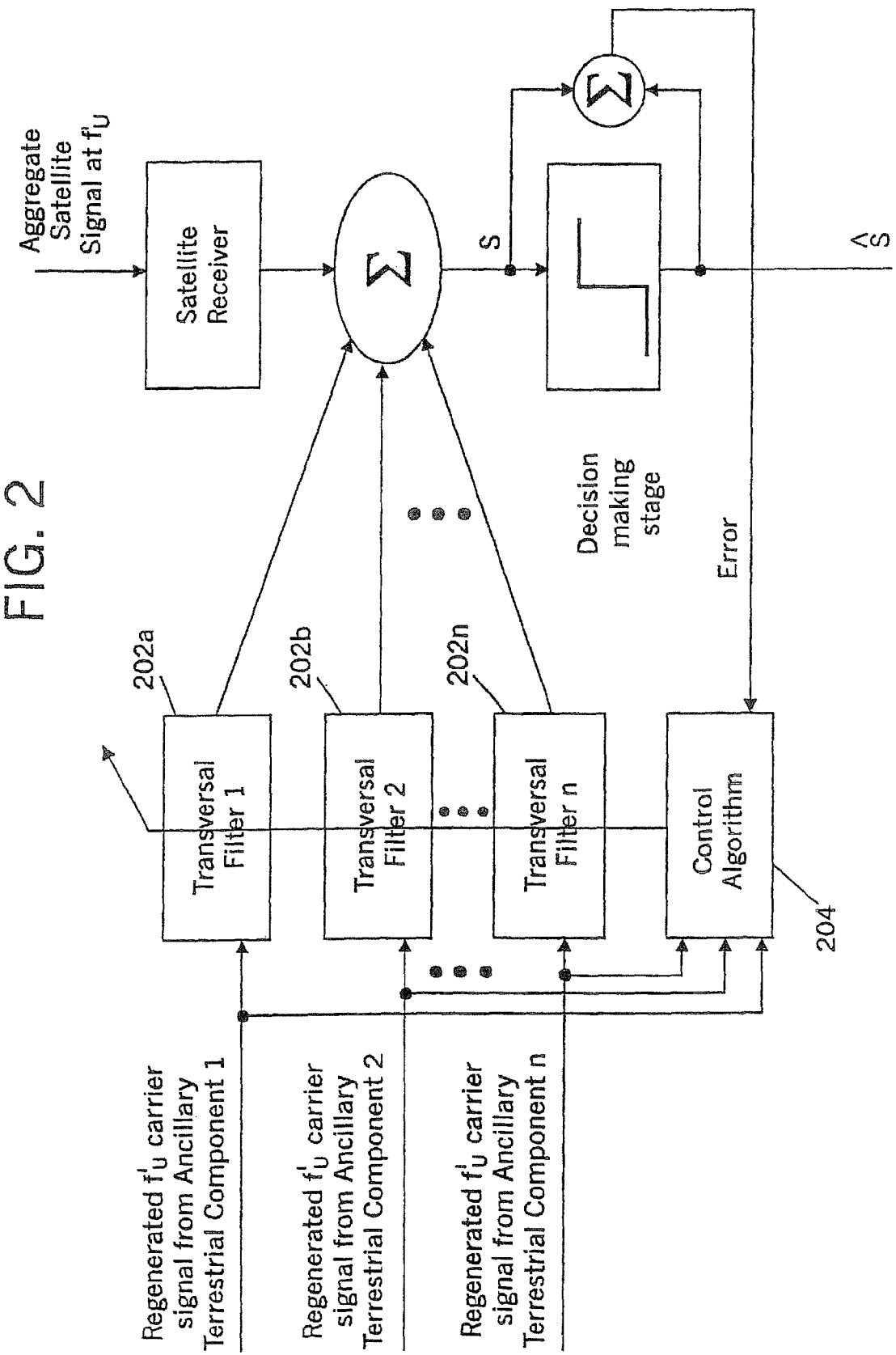
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
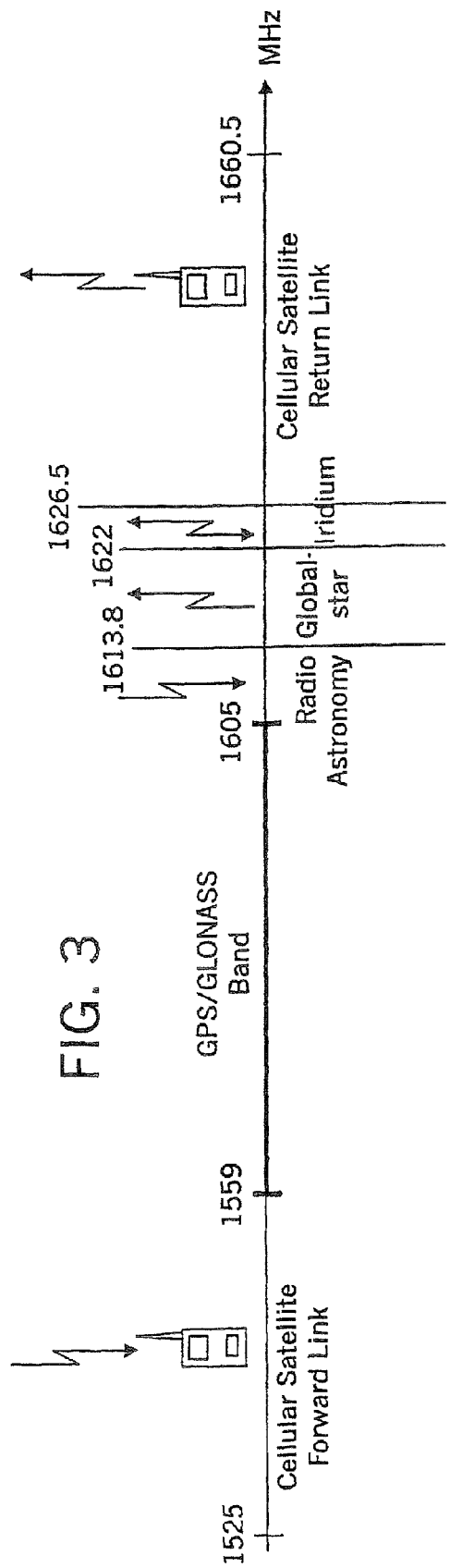
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time-division duplex frequency to transmit wireless communications to the radiotelephones and to receive wireless communications from the radiotelephones at different times. In particular, in some embodiments, the at least one time-division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time-division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigure.

Figure 4:
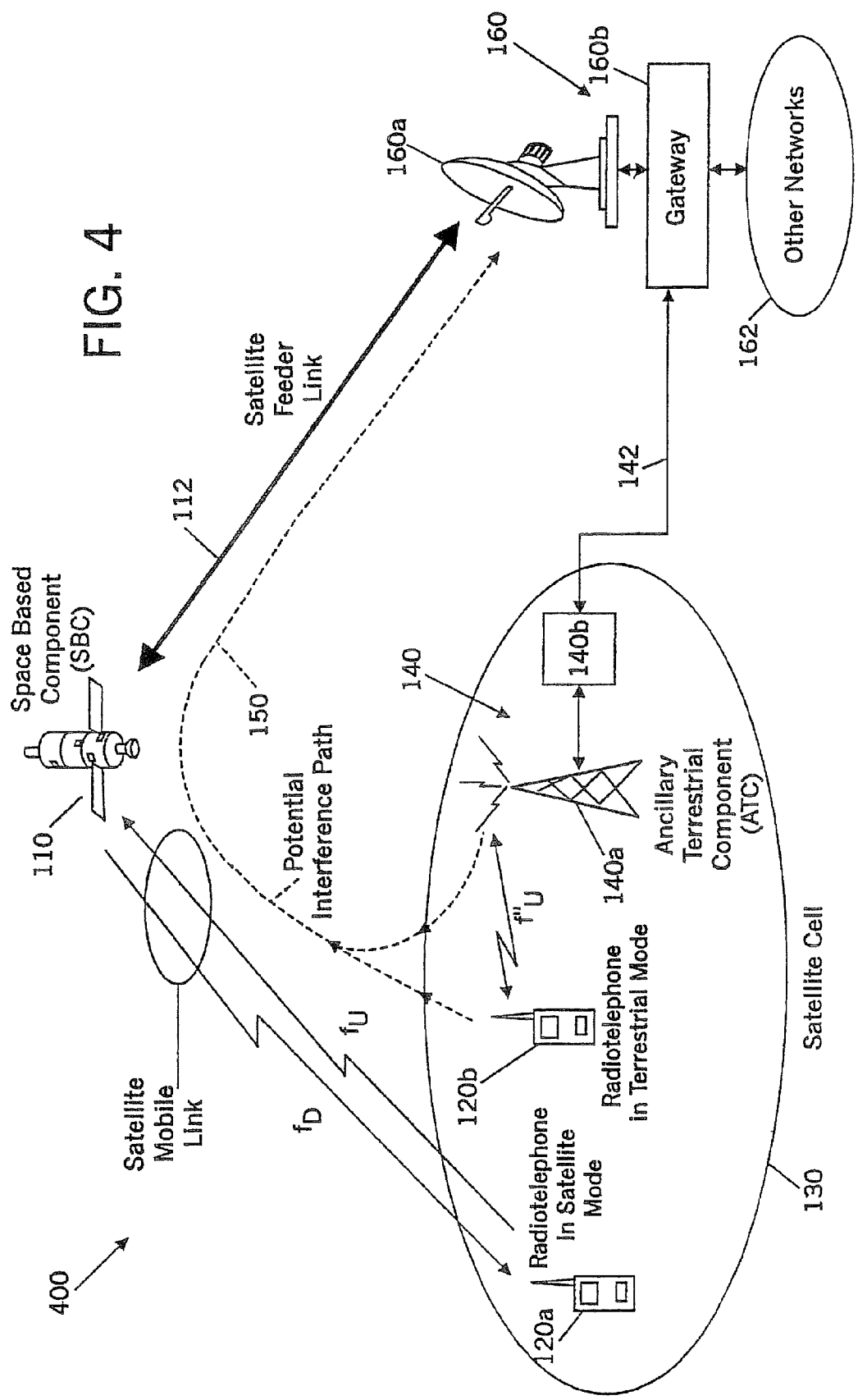
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8) ≈32 kbps on the return link.

Figure 6:
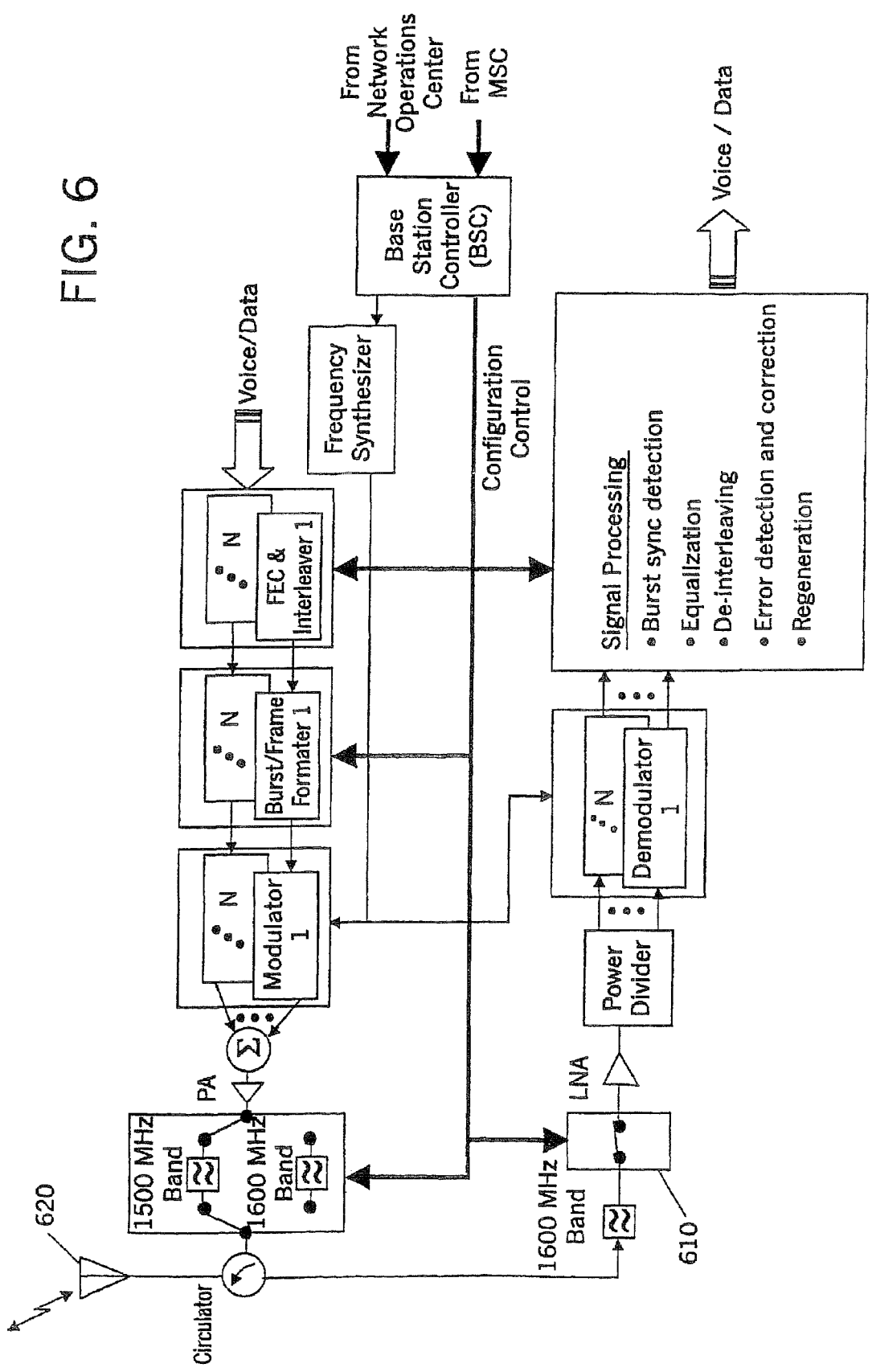
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
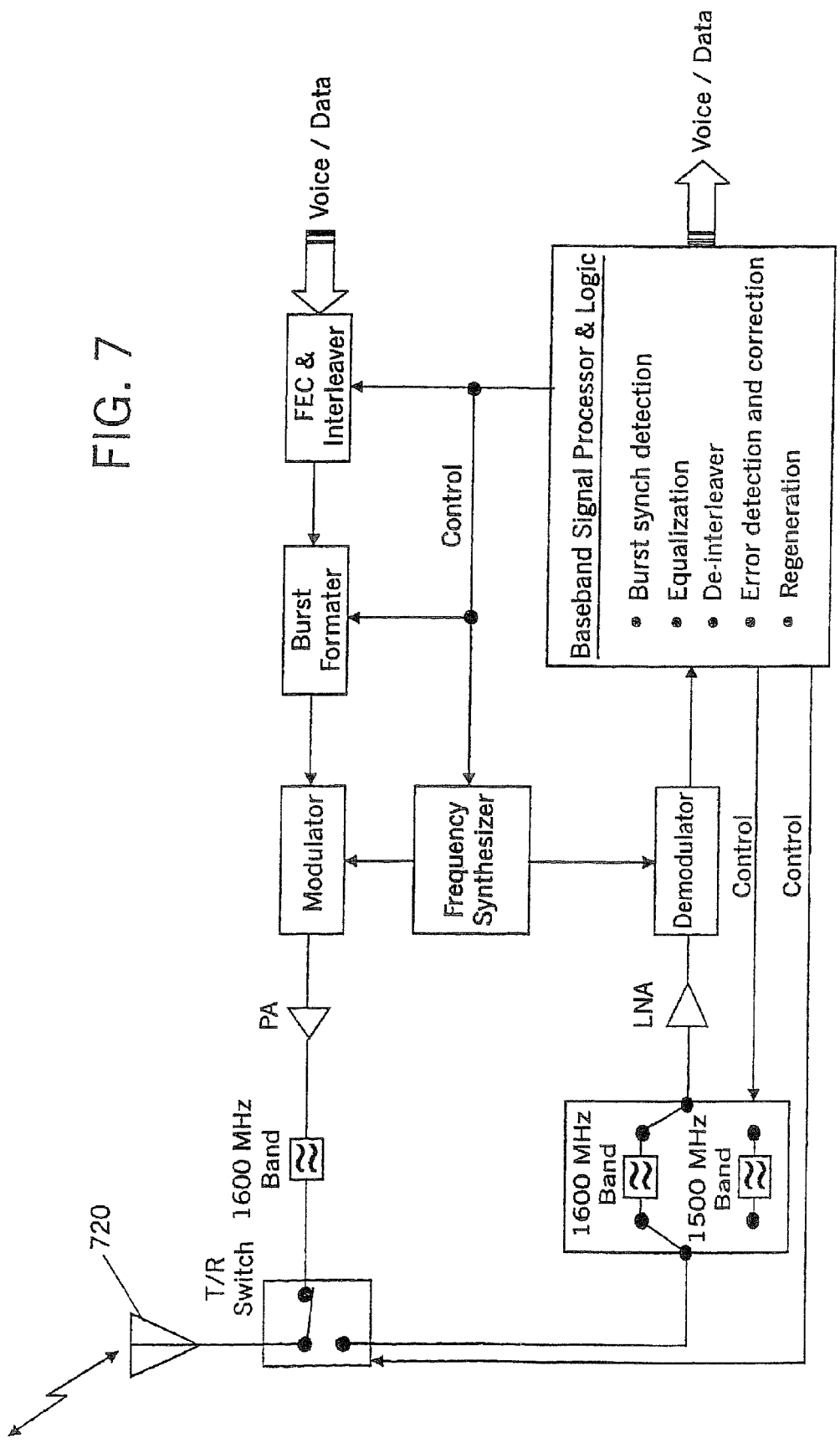
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\Im(\rho)$ represent a mapping from the power ($\rho$) domain to the frequency (v) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency (v) is the satellite carrier frequency that the ATC uses to communicate with the radiotelephone. According to embodiments of the invention, the mapping $\Im$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
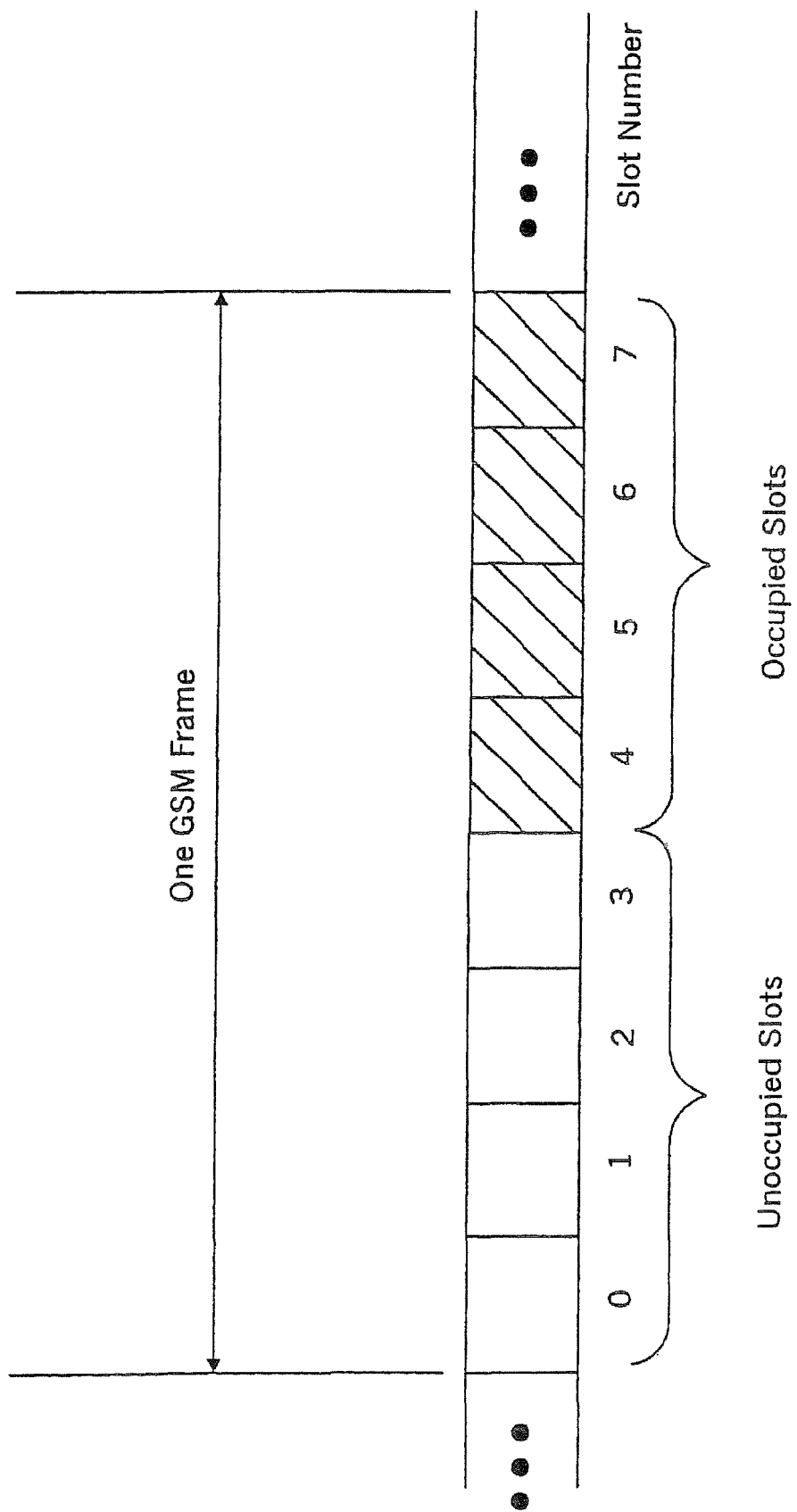
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

According to other embodiments of the invention, embodiments of FIGS. 8-10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell.

Figure 12:
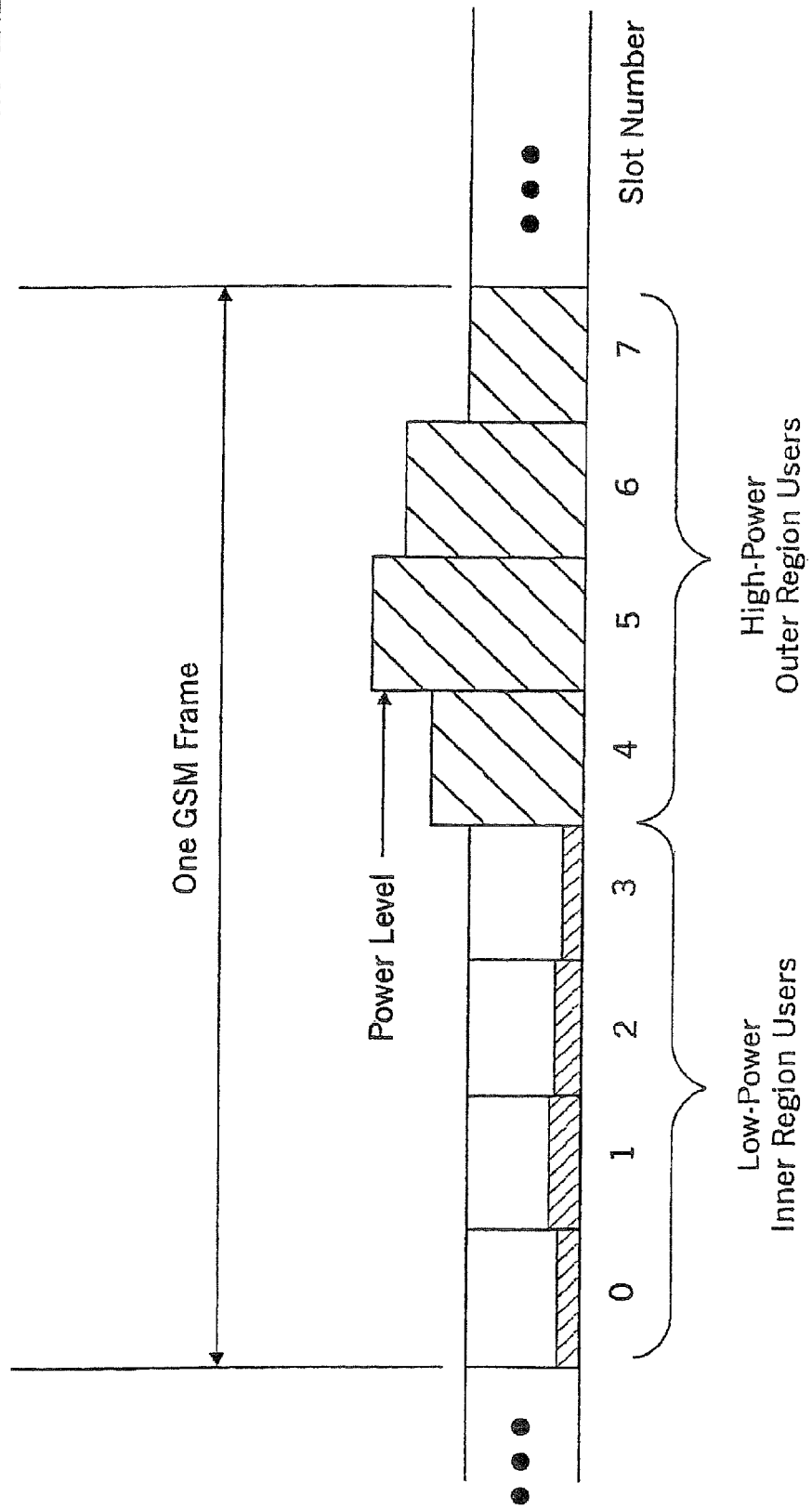
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8-10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to under-populate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Figure 13:
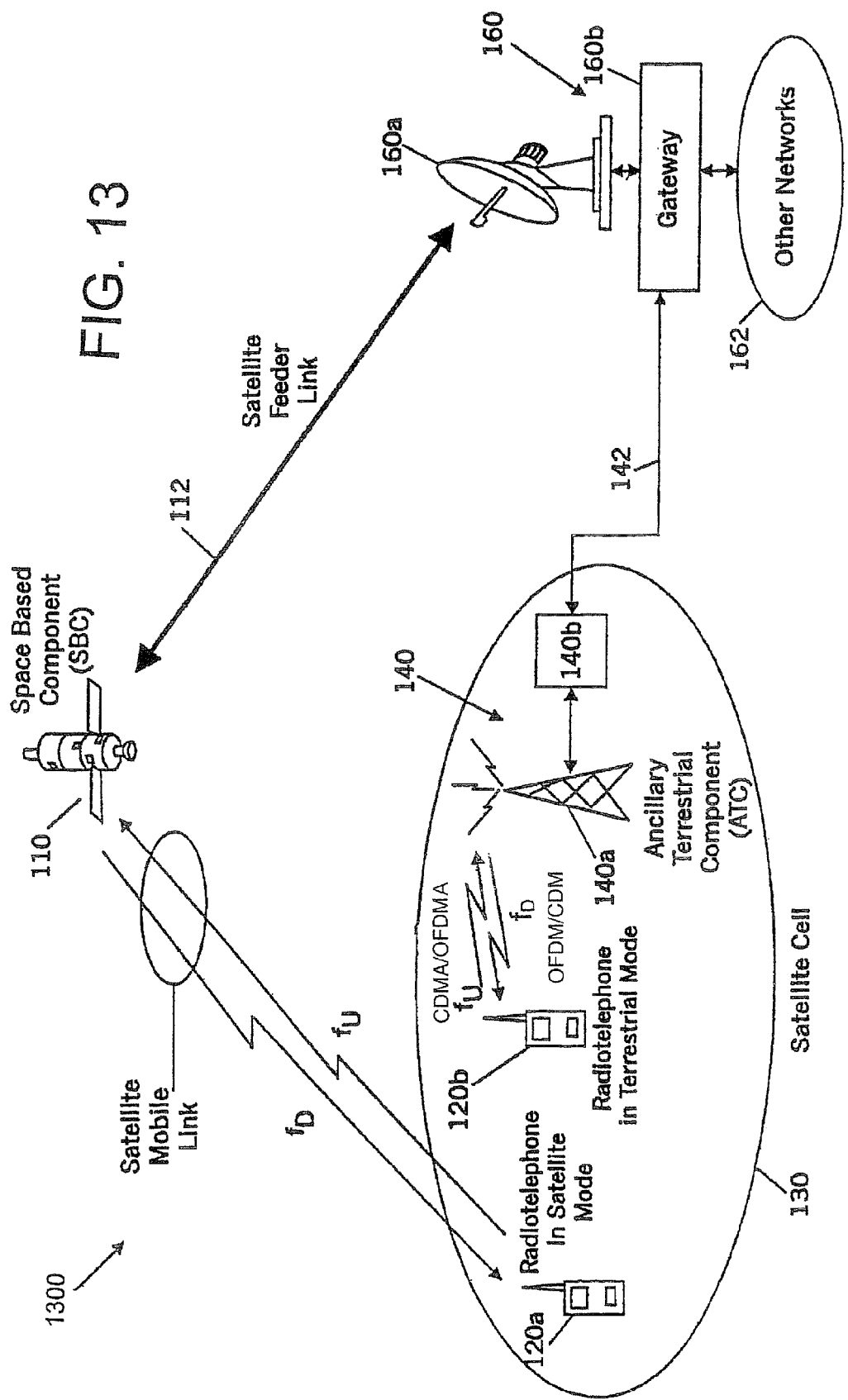
FIG. 13 is a schematic diagram of cellular satellite systems and methods according to other embodiments of the present invention.

Terrestrial Reuse of Cellular Satellite Frequency Spectrum Using Different Channel Separation Technologies in Forward and Reverse Links FIG. 13 is a schematic diagram of wireless communications systems and methods according to other embodiments of the present invention, in which an ancillary terrestrial network uses different channel separation technologies in the forward and reverse links thereof (e.g., a forward link may include channels separated by, for example, time and a reverse link may include channels separated by, for example, code). In other embodiments, the space-based component may also use different channel separation technologies in forward and reverse links thereof, as will be described in connection with FIG. 14.

More specifically, these wireless communications systems and methods 1300 include a space-based component 110 that is configured to receive wireless communications from radiotelephones, such as the radiotelephones 120a, in a satellite footprint 130 over a satellite uplink (also referred to as a reverse or return link) $f_U$ over at least one satellite band frequency, and to transmit wireless communications to the radiotelephones, such as the radiotelephones 120a, over a downlink (also referred to as a forward link) $f_D$ over at least one satellite band frequency. An ancillary terrestrial network including at least one ancillary terrestrial component 140 is configured to receive wireless communications from radiotelephones, such as the radiotelephones 120b, in the satellite footprint 130 over a plurality of satellite band frequencies that are divided into channels that are separated by one of frequency or code, and to transmit wireless communications to radiotelephones, such as radiotelephones 120b in the satellite footprint 130 over a plurality of satellite band frequencies that are divided into channels that are separated by a different one of frequency or code.

The term "different one of" as used above means that if the ancillary terrestrial component 140 is configured to receive wireless communications from radiotelephones over a plurality of satellite band frequencies that are divided into channels by, for example, frequency, then the ancillary terrestrial component 140 is configured to transmit wireless communications to radiotelephones over a plurality of satellite band frequencies that are divided into channels by code. Similarly, if the ancillary terrestrial component 140 is configured to receive wireless communications from radiotelephones over a plurality of satellite band frequencies that are divided into channels by, for example, code, then the ancillary terrestrial component 140 is configured to transmit wireless communications to radiotelephones over a plurality of satellite band frequencies that are divided into channels by frequency.

Recognizing that different times, phases and/or polarizations, in addition to, or instead of, different frequencies and/or codes, may be used to separate channels, in some embodiments, an ancillary terrestrial network including at least one ancillary terrestrial component 140 may be configured to receive wireless communications from radiotelephones, such as the radiotelephones 120b, in the satellite footprint 130 over a plurality of satellite band frequencies that are divided into channels that are separated by a first combination of frequency, code, time, phase and/or polarization and to transmit wireless communications to radiotelephones, such as radiotelephones 120b in the satellite footprint 130 over a plurality of satellite band frequencies that are divided into channels that are separated by a second combination of frequency, code, time, phase and/or polarization; wherein the first combination differs from the second combination. For example, the first combination of frequency, code, time, phase and/or polarization may comprise channels separated by frequency and/or phase and the second combination of frequency, code, time, phase and/or polarization may comprise channels separated by code and/or polarization. Many other first and second combinations are possible as will be recognized by those skilled in the art.

More generally, a space-based component (comprising one or more satellites), a terrestrial network and/or a radiotelephone may be configured to receive wireless communications over a plurality of frequencies that are divided into channels that are separated by a first combination of frequency, code, time, phase and/or polarization and to transmit wireless communications over a plurality of frequencies that are divided into channels that are separated by a second combination of frequency, code, time, phase and/or polarization, wherein the first combination differs from the second combination. For example, the first combination of frequency, code, time, phase and/or polarization may comprise channels separated by frequency and/or phase and the second combination of frequency, code, time, phase and/or polarization may comprise channels separated by code and/or polarization. Many other first and second combinations are possible as will be recognized by those skilled in the art. For example, the first combination of frequency, code, time, phase and/or polarization may comprise channels separated by polarization and the second combination of frequency, code, time, phase and/or polarization may comprise channels separated by frequency, code, time and/or phase. As a further example, the first combination of frequency, code, time, phase and/or polarization may comprise channels separated by phase and the second combination of frequency, code, time, phase and/or polarization may comprise channels separated by frequency, code, time and/or polarization.

Accordingly, in some embodiments, if the ancillary terrestrial component 140 is configured to receive wireless communications from radiotelephones over a plurality of satellite band frequencies that are divided into channels by, for example, frequency and/or time, then the ancillary terrestrial component 140 may be configured to transmit wireless communications to radiotelephones over a plurality of satellite band frequencies that are divided into channels by frequency and/or code. Similarly, in other embodiments, if the ancillary terrestrial component 140 is configured to receive wireless communications from radiotelephones over a plurality of satellite band frequencies that are divided into channels by, for example, code, time and/or frequency, then the ancillary terrestrial component 140 may be configured to transmit wireless communications to radiotelephones over a plurality of satellite band frequencies that are divided into channels by frequency, phase and/or polarization. Many other transmit and receive channel separation combinations are possible as will be recognized by those skilled in the art.

In some embodiments, the ancillary terrestrial component 140 uplink or return link uses satellite band frequencies $f_U$ that are divided into channels that are separated by code, using, for example, a Code Division Multiple Access (CDMA) technique and the ancillary terrestrial component 140 forward or downlink uses satellite band frequencies $f_D$ that are divided into channels that are separated by frequency, using, for example, an Orthogonal Frequency Division Multiplexing (OFDM) technique. In other embodiments, the ancillary terrestrial network return link receives wireless communications from radiotelephones 120b in the satellite footprint 130 over a plurality of satellite band frequencies $f_U$ that are separated by frequency, using, for example, an Orthogonal Frequency Division Multiple Access (OFDMA) technique and transmits wireless communications to radiotelephones 120b in the satellite footprint over a plurality of satellite band frequencies $f_D$ that are divided into channels that are separated by code, using, for example, a Code Division Multiplexing (CDM) technique.

In particular embodiments of the present invention, as illustrated in FIG. 13, the ancillary terrestrial component downlink $f_D$ uses Orthogonal Frequency Division Multiplexing (OFDM) to separate the plurality of satellite band frequencies $f_D$ by frequency, and Code Division Multiple Access (CDMA) is used on the ancillary terrestrial component uplink or return link $f_U$ to divide the satellite band uplink frequencies $f_U$ into channels that are separated by code. In other embodiments, CDM is used on the ancillary terrestrial component downlink and OFDMA is used on the ancillary terrestrial component uplink.

In yet other embodiments, the ancillary terrestrial component 140 is further configured to receive wireless communications from radiotelephones, such as radiotelephones 120b, in the satellite footprint 130 over a plurality of satellite band frequencies, and to transmit wireless communications to radiotelephones, such as radiotelephone 120b, in the satellite footprint over a plurality of satellite band frequencies using Frequency Division Duplex (FDD) and/or Time Division Duplex (TDD) modes. In still other embodiments, when an FDD mode is used, a given satellite band frequency may be used by the space-based component 110 to receive wireless communications from radiotelephones in the satellite footprint 130, and by the ancillary terrestrial network 140 to transmit wireless communications to the radiotelephones in the satellite footprint 130. Moreover, in yet other embodiments, a given satellite band frequency may be used by the space-based component 110 to transmit wireless communications to radiotelephones in the satellite footprint 130, and by the ancillary terrestrial network 140 to receive wireless communications from the radiotelephone in the satellite footprint 130. Thus, in these embodiments, band reversal may be employed, at least in part, by reversing the designations of $f_D$ and $f_U$ in the satellite mobile links or in the links between the ancillary terrestrial component 140 and the radiotelephones 120b.

Figure 14:
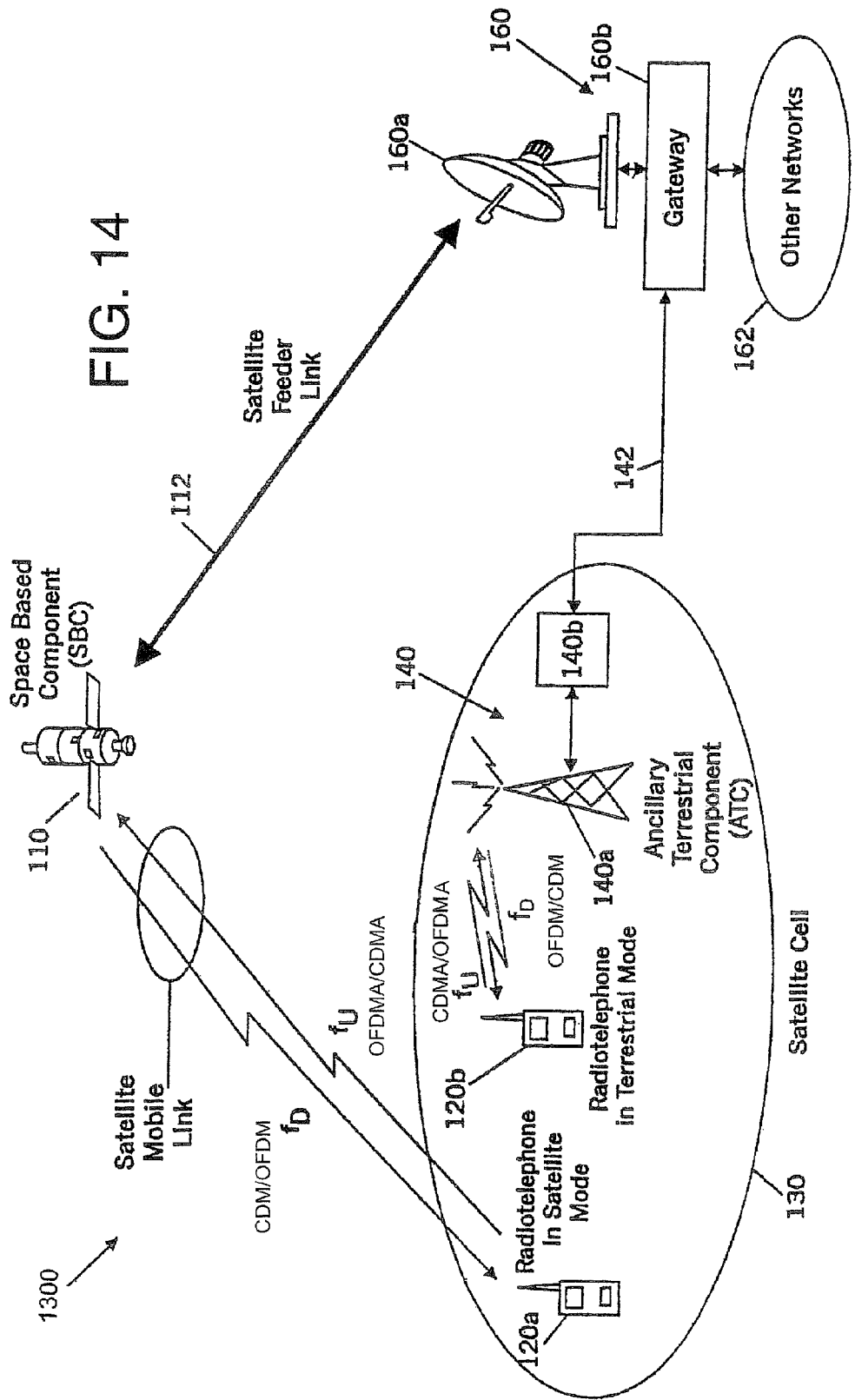
FIG. 14 is a schematic diagram of cellular satellite systems and methods according to still other embodiments of the present invention.

FIG. 14 illustrates other embodiments of the present invention, wherein the satellite service links (also referred to as satellite mobile links) also use different channel separation technologies in the forward and reverse links thereof. Thus, as shown in FIG. 14, the satellite downlink may use one of CDM or OFDM and the satellite uplink $f_U$ may use one of OFDM or CDMA.

Accordingly, in some embodiments of the present invention, a forward link transmission of an ATC 140 may be based on any technology and/or air interface that relies on frequency to separate two or more channels. An example of such a technology and/or air interface is Frequency Division Multiplexing (FDM), which, in some embodiments, may be Orthogonal FDM (OFDM). In still further embodiments, the forward link transmissions of an ATC 140 may be based on an OFM and/or OFDM technology and/or air interface and return link transmissions from user devices (e.g., radiotelephones 120b) to the ATC 140 may be based on any technology and/or air interface that relies on the usage of different codes to separate two or more channels (e.g., Code Division Multiple Access (CDMA)). In some embodiments, the reverse may also be performed. That is, the forward link transmission of an ATC 140 may be based on a CDM technology and/or air interface and return link transmissions from user devices 120b to the ATC 140 may be based on any technology and/or air interface that relies on frequency to separate two or more channels.

The ATC 140 may also be configured to communicate with one or more user devices 120b in a Frequency Division Duplex (FDD) mode and/or in a Time Division Duplex (TDD) mode. Furthermore, in the FDD mode, the communications between the ATC 140 and the one or more user devices 120b may be based on a reverse frequency mode relative to the SBC 110.

In yet other embodiments, the SBC 110 may employ/use any technology and/or air interface in its forward and return transmissions and the technology and/or air interface employed/used by the SBC 110 in its forward transmissions may be the same, substantially the same, similar or different relative to the technology and/or air interface employed/used by the SBC 110 for the reception of transmissions from user devices. For example, the SBC transmissions may be based on an FDM and/or OFDM technology and/or air interface, while reception by the SBC may be based on a CDMA and/or TDMA technology and/or air interface.

In any of the above-described embodiments, the radiotelephones 120 may be configured to communicate with the ATC and/or SBC according to the link technologies that are being used.

Some embodiments of the present invention that use different channel separation technologies and/or different air interfaces in forward and reverse links may arise from recognition that at least one design constraint (e.g., size, weight, power dissipation, power amplifier linearity, out-of-channel emissions, etc.) may be imposed on a transmitter of a radiotelephone that may differ from one or more design constraints that may be imposed on a transmitter of a base station. Accordingly, it may be advantageous and/or preferential to use different channel separation technologies and/or different air interfaces in forward and reverse links. Other considerations such as, for example, interference, system capacity, system latency, inter-modulation products, spectral efficiency, cognitive radio capability, regulatory constraints, etc. may also, in some embodiments, dictate/encourage different channel separation technologies and/or different air interfaces in forward and reverse links of space-based communications and/or terrestrially-based communications.

Embodiments of the present invention that use different channel separation technologies and/or different air interfaces in forward and reverse links may be sharply contrasted from conventional techniques that provide different capacities in forward and reverse links while using the same channel separation technology and/or the same air interface in the forward and reverse links. In particular, it is known to provide greater capacity in a forward link (downlink) compared to a return link (uplink or reverse link) when transmitting data, to accommodate a relatively small amount of data to be uploaded (e.g., a mouse click) and a relatively large amount of data to be downloaded (e.g., a web page with graphics). In specific examples, asymmetric DSL (ADSL) technology can provide greater capacity in a downlink compared to an uplink, yet each one of the uplink and downlink provide channels that are separated by frequency. OFDM/OFDMA may also provide asymmetrical uplink and downlink capacity, yet each one of uplink channels and downlink channels are separated by frequency. Other wireless systems (such as GSM-based systems) may employ an EDGE mode on a downlink that provide 8-PSK modulation and may employ a GPRS mode on an uplink that provides GMSK modulation. Yet again, however, each one of uplink and downlink channels are separated by time. Similarly, CDMA technology may use fewer codes on an uplink compared to a downlink, to accommodate higher data capacity on the downlink, yet each one of the uplink and downlink use channels that are separated by code. In sharp contrast, some embodiments of the present invention use different channel separation technologies and/or different air interfaces in the forward and reverse links thereof.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless communications system comprising:
a space-based component that is configured to receive wireless communications from radiotelephones in a satellite footprint over at least one satellite band frequency and to transmit wireless communications to radiotelephones in the satellite footprint over at least one satellite band frequency; and
an ancillary terrestrial component that is configured to receive wireless communications from radiotelephones in the satellite footprint over a plurality of satellite band frequencies that are divided into channels that are separated by one of frequency or code and to transmit wireless communications to radiotelephones in the satellite footprint over a plurality of satellite band frequencies that are divided into channels that are separated by a different one of frequency or code.

2. A system according to claim 1 wherein the ancillary terrestrial component is configured to receive wireless communications from radiotelephones in the satellite footprint over a plurality of satellite band frequencies that are divided into channels that are separated by code and to transmit wireless communications to radiotelephones in the satellite footprint over a plurality of satellite band frequencies that are divided into channels that are separated by frequency.

3. A system according to claim 2 wherein the ancillary terrestrial component is configured to receive wireless communications from radiotelephones in the satellite footprint over a plurality of satellite band frequencies that are divided into channels that are separated by code using Code Division Multiple Access (CDMA) and to transmit wireless communications to radiotelephones in the satellite footprint over a plurality of satellite band frequencies that are divided into channels that are separated by frequency using Orthogonal Frequency Division Multiplexing (OFDM).

4. A system according to claim 1 wherein the ancillary terminal component is configured to receive wireless communications from radiotelephones in the satellite footprint over a plurality of satellite band frequencies that are divided into channels that are separated by frequency and to transmit wireless communications to radiotelephones in the satellite footprint over a plurality of satellite band frequencies that are divided into channels that are separated by code.

5. A system according to claim 4 wherein the ancillary terrestrial component is configured to receive wireless communications from radiotelephones in the satellite footprint over a plurality of satellite band frequencies that are divided into channels that are separated by frequency using a Global System for Mobile communications (GSM) standard and to transmit wireless communications to radiotelephones in the satellite footprint over a plurality of satellite band frequencies that are divided into channels that are separated by code using Code Division Multiplexing (CDM).

6. A system according to claim 1 wherein the ancillary terrestrial component is further configured to receive wireless communications from radiotelephones in the satellite footprint over a plurality of satellite band frequencies and to transmit wireless communications to radiotelephones in the satellite footprint over a plurality of satellite band frequencies using Frequency Division Duplex (FDD) and/or Time Division Duplex (TDD) mode(s).

7. A system according to claim 1 wherein the ancillary terrestrial component is further configured to receive wireless communications from radiotelephones in the satellite footprint over a plurality of satellite band frequencies and to transmit wireless communications to radiotelephones in the satellite footprint over a plurality of satellite band frequencies using a Frequency Division Duplex (FDD) mode and wherein a given satellite band frequency is used by the space-based component to receive wireless communications from radiotelephones in the satellite footprint and by the ancillary terrestrial component to transmit wireless communications to the radiotelephones in the satellite footprint.

8. A system according to claim 1 wherein the ancillary terrestrial component is further configured to receive wireless communications from radiotelephones in the satellite footprint over a plurality of satellite band frequencies and to transmit wireless communications to radiotelephones in the satellite footprint over a plurality of satellite band frequencies using a Frequency Division Duplex (FDD) mode and wherein a given satellite band frequency is used by the space-based component to transmit wireless communications to radiotelephones in the satellite footprint and by the ancillary terrestrial component to receive wireless communications from the radiotelephones in the satellite footprint.

9. A system according to claim 1 wherein the space-based component is also configured to receive wireless communications from radiotelephones in the satellite footprint over a plurality of satellite band frequencies that are divided into channels that are separated by one of frequency or code and to transmit wireless communications to radiotelephones in the satellite footprint over a plurality of satellite band frequencies that are divided into channels that are separated by a different one of frequency or code.

10. A system according to claim 9 wherein the space-based component is configured to receive wireless communications from radiotelephones in the satellite footprint over a plurality of satellite band frequencies that are divided into channels that are separated by code and to transmit wireless communications to radiotelephones in the satellite footprint over a plurality of satellite band frequencies that are divided into channels that are separated by frequency.

11. A system according to claim 10 wherein the space-based component is configured to receive wireless communications from radiotelephones in the satellite footprint over a plurality of satellite band frequencies that are divided into channels that are separated by code using Code Division Multiple Access (CDMA) and to transmit wireless communications to radiotelephones in the satellite footprint over a plurality of satellite band frequencies that are divided into channels that are separated by frequency using Orthogonal Frequency Division Multiplexing (OFDM).

12. A wireless communications system comprising:
a terrestrial network that is configured to receive wireless communications from radiotelephones over a plurality of satellite band frequencies that are divided into channels that are separated by one of frequency or code and to transmit wireless communications to radiotelephones over a plurality of satellite band frequencies that are divided into channels that are separated by a different one of frequency or code.

13. A system according to claim 12 wherein the terrestrial network is configured to receive wireless communications from radiotelephones over a plurality of satellite band frequencies that are divided into channels that are separated by code and to transmit wireless communications to radiotelephones over a plurality of satellite band frequencies that are divided into channels that are separated by frequency.

14. A system according to claim 13 wherein the terrestrial network is configured to receive wireless communications from radiotelephones over a plurality of satellite band frequencies that are divided into channels that are separated by code using Code Division Multiple Access (CDMA) and to transmit wireless communications to radiotelephones over a plurality of satellite band frequencies that are divided into channels that are separated by frequency using Orthogonal Frequency Division Multiplexing (OFDM).

15. A system according to claim 12 wherein the terrestrial network is configured to receive wireless communications from radiotelephones over a plurality of satellite band frequencies that are divided into channels that are separated by frequency and to transmit wireless communications to radiotelephones over a plurality of satellite band frequencies that are divided into channels that are separated by code.

16. A system according to claim 15 wherein the terrestrial network is configured to receive wireless communications from radiotelephones over a plurality of satellite band frequencies that are divided into channels that are separated by frequency using a Global System for Mobile communications (GSM) standard and to transmit wireless communications to radiotelephones over a plurality of satellite band frequencies that are divided into channels that are separated by code using Code Division Multiplexing (CDM).

17. A system according to claim 12 wherein the terrestrial network is further configured to receive wireless communications from radiotelephones over a plurality of satellite band frequencies and to transmit wireless communications to radiotelephones over a plurality of satellite band frequencies using Frequency Division Duplex (FDD) and/or Time Division Duplex (TDD) mode(s).

18. A radiotelephone comprising:
a transceiver system that is configured to transmit wireless communications over a plurality of satellite band frequencies that are divided into channels that are separated by one of frequency or code and to receive wireless communications over a plurality of satellite band frequencies that are divided into channels that are separated by a different one of frequency or code.

19. A radiotelephone according to claim 18 wherein the transceiver system is configured to transmit wireless communications over a plurality of satellite band frequencies that are divided into channels that are separated by code and to receive wireless communications over a plurality of satellite band frequencies that are divided into channels that are separated by frequency.

20. A radiotelephone according to claim 19 wherein the transceiver system is configured to transmit wireless communications over a plurality of satellite band frequencies that are divided into channels that are separated by code using Code Division Multiple Access (CDMA) and to receive wireless communications over a plurality of satellite band frequencies that are divided into channels that are separated by frequency using Orthogonal Frequency Division Multiplexing (OFDM).

21. A radiotelephone according to claim 18 wherein the transceiver system is configured to transmit wireless communications over a plurality of satellite band frequencies that are divided into channels that are separated by frequency and to receive wireless communications over a plurality of satellite band frequencies that are divided into channels that are separated by code.

22. A radiotelephone according to claim 21 wherein the transceiver system is configured to transmit wireless communications over a plurality of satellite band frequencies that are divided into channels that are separated by time using a Global System for Mobile communications (GSM) standard and to receive wireless communications over a plurality of satellite band frequencies that are divided into channels that are separated by code using Code Division Multiplexing (CDM).

23. A radiotelephone according to claim 18 wherein the transceiver system is further configured to receive wireless communications over a plurality of satellite band frequencies and to transmit wireless communications over a plurality of satellite band frequencies using Frequency Division Duplex (FDD) and/or Time Division Duplex (TDD) mode(s).

24. A radiotelephone according to claim 18 wherein the transceiver system is further configured to transmit wireless communications over satellite band frequencies that are divided into channels that are separated by one of frequency or code and to receive wireless communications over satellite band frequencies that are divided into channels that are separated by a same one of frequency or code.

25. A wireless communications method comprising:
receiving wireless communications at a space-based component from radiotelephones in a satellite footprint over at least one satellite band frequency and transmitting wireless communications from the space-based component to radiotelephones in the satellite footprint over at least one satellite band frequency; and
receiving wireless communications from radiotelephones in the satellite footprint at an ancillary terrestrial component over a plurality of satellite band frequencies that are divided into channels that are separated by one of frequency or code and transmitting wireless communications from the ancillary terrestrial component to radiotelephones in the satellite footprint over a plurality of satellite band frequencies that are divided into channels that are separated by a different one of frequency or code.

26. A method according to claim 25 wherein the plurality of satellite band frequencies used for receiving are divided into channels that are separated by code using Code Division Multiple Access (CDMA) and wherein the plurality of satellite band frequencies used for transmitting are divided into channels that are separated by frequency using Orthogonal Frequency Division Multiplexing (OFDM).

27. A method according to claim 25 wherein the plurality of satellite band frequencies used for receiving are divided into channels that are separated by frequency using a Global System for Mobile communications (GSM) standard and wherein the plurality of satellite band frequencies used for transmitting are divided into channels that are separated by code using Code Division Multiplexing (CDM).

28. A method according to claim 25 further comprising:
receiving wireless communications from radiotelephones in the satellite footprint at the ancillary terrestrial component over a plurality of satellite band frequencies and transmitting wireless communications from the ancillary terrestrial component to radiotelephones in the satellite footprint over a plurality of satellite band frequencies using Frequency Division Duplex (FDD) and/or Time Division Duplex (TDD) mode(s).

29. A method according to claim 25 further comprising:
receiving wireless communications from radiotelephones in the satellite footprint at the ancillary terrestrial component over a plurality of satellite band frequencies and transmitting wireless communications from the ancillary terrestrial component to radiotelephones in the satellite footprint over a plurality of satellite band frequencies using a Frequency Division Duplex (FDD) mode and wherein a given satellite band frequency is used by the space-based component to receive wireless communications from radiotelephones in the satellite footprint and by the ancillary terrestrial component to transmit wireless communications to the radiotelephones in the satellite footprint.

30. A method according to claim 25 further comprising:
receiving wireless communications from radiotelephones in the satellite footprint at the ancillary terrestrial component over a plurality of satellite band frequencies and transmitting wireless communications from the ancillary terrestrial component to radiotelephones in the satellite footprint over a plurality of satellite band frequencies using a Frequency Division Duplex (FDD) mode and wherein a given satellite band frequency is used by the space-based component to transmit wireless communications to radiotelephones in the satellite footprint and by the ancillary terrestrial component to receive wireless communications from the radiotelephones in the satellite footprint.

31. A method according to claim 25 further comprising:
receiving wireless communications at the space-based component from radiotelephones in the satellite footprint over a plurality of satellite band frequencies that are divided into channels that are separated by one of frequency or code and transmitting wireless communications from the space-based component to radiotelephones in the satellite footprint over a plurality of satellite band frequencies that are divided into channels that are separated by a different one of frequency or code.

32. A method according to claim 31 wherein the plurality of satellite band frequencies used for receiving are divided into channels that are separated by code using Code Division Multiple Access (CDMA) and wherein the plurality of satellite band frequencies used for transmitting are divided into channels that are separated by frequency using Orthogonal Frequency Division Multiplexing (OFDM).

33. A wireless communications method comprising:
receiving wireless communications from radiotelephones at a terrestrial network over a plurality of satellite band frequencies that are divided into channels that are separated by one of frequency or code; and
transmitting wireless communications by the terrestrial network to radiotelephones over a plurality of satellite band frequencies that are divided into channels that are separated by a different one of frequency or code.

34. A method according to claim 33 wherein the plurality of satellite band frequencies used for receiving are divided into channels that are separated by code using Code Division Multiple Access (CDMA) and wherein the plurality of satellite band frequencies used for transmitting are divided into channels that are separated by frequency using Orthogonal Frequency Division Multiplexing (OFDM).

35. A method according to claim 33 wherein the a plurality of satellite band frequencies used for receiving are divided into channels that are separated by frequency using a Global System for Mobile communications (GSM) standard and wherein the plurality of satellite band frequencies used for transmitting are divided into channels that are separated by code using Code Division Multiplexing (CDM).

36. A method according to claim 33 further comprising:
receiving wireless communications at the terrestrial network from radiotelephones over a plurality of satellite band frequencies and transmitting wireless communications to radiotelephones from the terrestrial network over a plurality of satellite band frequencies using Frequency Division Duplex (FDD) and/or Time Division Duplex (TDD) mode(s).

37. A radiotelephone operating method comprising:
transmitting wireless communications over a plurality of satellite band frequencies that are divided into channels that are separated by one of frequency or code; and
receiving wireless communications over a plurality of satellite band frequencies that are divided into channels that are separated by a different one of frequency or code.

38. A method according to claim 37 wherein the plurality of satellite band frequencies used for transmitting are divided into channels that are separated by code using Code Division Multiple Access (CDMA) and wherein the plurality of satellite band frequencies used for receiving are divided into channels that are separated by frequency using Orthogonal Frequency Division Multiplexing (OFDM).

39. A method according to claim 37 wherein the plurality of satellite band frequencies used for transmitting are divided into channels that are separated by time using a Global System for Mobile communications (GSM) standard and wherein the plurality of satellite band frequencies used for receiving are divided into channels that are separated by code using Code Division Multiplexing (CDM).

40. A method according to claim 37 further comprising:
receiving wireless communications over a plurality of satellite band frequencies and transmitting wireless communications over a plurality of satellite band frequencies using Frequency Division Duplex (FDD) and/or Time Division Duplex (TDD) mode(s).

41. A method according to claim 37 further comprising:
transmitting wireless communications over satellite band frequencies that are divided into channels that are separated by one of frequency or code; and
receiving wireless communications over satellite band frequencies that are divided into channels that are separated by a same one of frequency or code.

42. A method of providing wireless communications, the method comprising:
transmitting over a plurality of frequencies that are divided into channels that are separated by a first combination of frequency, code, time, phase and/or polarization; and
receiving over a plurality of frequencies that are divided into channels that are separated by a second combination of frequency, code, time, phase and/or polarization;
wherein the first combination and the second combination differ therebetween.

43. A method according to claim 42 wherein the plurality of frequencies comprise at least some satellite band frequencies.

44. A method according to claim 42 wherein the transmitting and receiving is performed by a space-based component, terrestrial network and/or a radiotelephone.

45. A method according to claim 44 wherein the plurality of frequencies used for transmitting are divided into channels that are separated by frequency and wherein the plurality of frequencies used for receiving are divided into channels that are separated by code, time, phase and/or polarization.

46. A method according to claim 44 wherein the plurality of frequencies used for transmitting are divided into channels that are separated by code and wherein the plurality of frequencies used for receiving are divided into channels that are separated by frequency, time, phase and/or polarization.

47. A method according to claim 44 wherein the plurality of frequencies used for transmitting are divided into channels that are separated by time and wherein the plurality of frequencies used for receiving are divided into channels that are separated by frequency, code, phase and/or polarization.

48. A method according to claim 44 wherein the plurality of frequencies used for transmitting are divided into channels that are separated by phase and wherein the plurality of frequencies used for receiving are divided into channels that are separated by frequency, code, time and/or polarization.

49. A method according to claim 44 wherein the plurality of frequencies used for transmitting are divided into channels that are separated by polarization and wherein the plurality of frequencies used for receiving are divided into channels that are separated by frequency, code, time and/or phase.

50. A communications system comprising:
a transmitter that is configured to transmit over a plurality of frequencies that are divided into channels that are separated by a first combination of frequency, code, time, phase and/or polarization; and
a receiver that that is configured to receive over a plurality of frequencies that are divided into channels that are separated by a second combination of frequency, code, time, phase and/or polarization;
wherein the first combination and the second combination differ therebetween.

51. A system according to claim 50 wherein the plurality of frequencies comprise at least some satellite band frequencies.

52. A system according to claim 50 wherein the transmitter and receiver are part of a space-based component, terrestrial network and/or a radiotelephone.

53. A system according to claim 52 wherein the plurality of frequencies used by the transmitter are divided into channels that are separated by frequency and wherein the plurality of frequencies used by the receiver are divided into channels that are separated by code, time, phase and/or polarization.

54. A system according to claim 52 wherein the plurality of frequencies used by the transmitter are divided into channels that are separated by code and wherein the plurality of frequencies used by the receiver are divided into channels that are separated by frequency, time, phase and/or polarization.

55. A system according to claim 52 wherein the plurality of frequencies used by the transmitter are divided into channels that are separated by time and wherein the plurality of frequencies used by the receiver are divided into channels that are separated by frequency, code, phase and/or polarization.

56. A system according to claim 52 wherein the plurality of frequencies used by the transmitter are divided into channels that are separated by phase and wherein the plurality of frequencies used by the receiver are divided into channels that are separated by frequency, code, time and/or polarization.

57. A system according to claim 52 wherein the plurality of frequencies used by the transmitter are divided into channels that are separated by polarization and wherein the plurality of frequencies used by the receiver are divided into channels that are separated by frequency, code, time and/or phase.

* * * * *

UNITED STATES PATENT AND TRADEMARK OFFICE
CERTIFICATE OF CORRECTION

| | |
|---|---|
| PATENT NO. | : 7,792,069 B2 |
| APPLICATION NO. | : 11/762323 |
| DATED | : September 7, 2010 |
| INVENTOR(S) | : Karabinis |

It is certified that error appears in the above-identified patent and that said Letters Patent is hereby corrected as shown below:

On Title Page Item [56]:
Page 3, Other Publications, right column, line 19 "Global.com,": Please correct "Supplemental Phones" to read -- Supplemental Satellite Phones --

Column 20, Claim 4, Line 58: Please correct "terminal" to read -- terrestrial --

Signed and Sealed this
Eighth Day of February, 2011

David J. Kappos
*Director of the United States Patent and Trademark Office*